United States Patent
Noble (10) Patent No.: US 7,415,792 B1
(45) Date of Patent: Aug. 26, 2008

(54) FLOAT FISHING APPARATUS

(76) Inventor: Mark D. Noble, 124 Harwell Dr., St. Simons Is., GA (US) 31522

(*) Notice: Subject to any disclaimer, the term of this patent is extended or adjusted under 35 U.S.C. 154(b) by 212 days.

(21) Appl. No.: 10/904,353

(22) Filed: Nov. 5, 2004

(51) Int. Cl.
*A01K 93/00* (2006.01)
(52) U.S. Cl. .................. 43/42.31; 43/43.15; 43/44.87
(58) Field of Classification Search ............. 43/44.87, 43/43.1, 44.9, 42.32, 43.15, 43.11, 42.31, 43/44.91
See application file for complete search history.

(56) References Cited

U.S. PATENT DOCUMENTS

| | | | | |
|---|---|---|---|---|
| 240,611 A * | 4/1881 | Redfield | ............ | 43/43.1 |
| 351,523 A * | 10/1886 | Pflueger | ............ | 43/43.15 |
| 691,407 A * | 1/1902 | Pacetty | ............ | 43/43.15 |
| 786,597 A * | 4/1905 | Picken | ............ | 43/43.15 |
| 1,792,989 A * | 2/1931 | La Gue | ............ | 43/42.31 |
| 2,181,458 A * | 11/1939 | La Gue | ............ | 43/44.87 |
| 2,223,823 A * | 12/1940 | Hampton | ............ | 43/43.15 |
| 2,239,911 A * | 4/1941 | Dorn | ............ | 43/15 |
| 2,283,779 A * | 5/1942 | Winter | ............ | 43/43.15 |
| 2,456,254 A * | 12/1948 | Caruso | ............ | 43/43.15 |
| 2,493,971 A * | 1/1950 | Johnson | ............ | 43/44.91 |
| 2,498,815 A * | 2/1950 | McVay | ............ | 43/43.15 |
| 2,509,704 A * | 5/1950 | Streitwieser | ............ | 43/44.9 |
| 2,531,418 A * | 11/1950 | Fitzharris | ............ | 43/43.15 |
| 2,554,318 A * | 5/1951 | Wardrip et al. | ............ | 43/41.2 |
| 2,605,577 A * | 8/1952 | Waugler | ............ | 43/42.39 |
| 2,607,153 A * | 8/1952 | Lambach | ............ | 43/43.1 |
| 2,609,634 A * | 9/1952 | Simpson | ............ | 43/44.91 |
| 2,693,049 A * | 11/1954 | Atton | ............ | 43/44.9 |
| 2,710,479 A * | 6/1955 | Gehrig | ............ | 43/43.15 |
| 2,710,480 A * | 6/1955 | Gehrig | ............ | 43/43.15 |
| 2,712,197 A * | 7/1955 | Lewis | ............ | 43/43.15 |
| 2,716,831 A * | 9/1955 | Glass | ............ | 43/42.31 |
| 2,741,864 A * | 4/1956 | Shotton | ............ | 43/42.31 |
| 2,753,650 A * | 7/1956 | Rentz et al. | ............ | 43/43.1 |
| 2,766,549 A * | 10/1956 | Dickerson | ............ | 43/44.98 |
| 2,768,464 A * | 10/1956 | Volz | ............ | 43/41.2 |
| 2,772,504 A * | 12/1956 | Zerante et al. | ............ | 43/44.95 |
| 2,791,060 A * | 5/1957 | Kender | ............ | 43/43.15 |
| 2,803,081 A * | 8/1957 | Nicholson | ............ | 43/43.1 |
| 2,811,805 A * | 11/1957 | McGee | ............ | 43/42.31 |
| 2,892,283 A * | 6/1959 | Hudson | ............ | 43/43.15 |
| 2,910,798 A * | 11/1959 | Bias | ............ | 43/44.9 |
| 2,931,124 A * | 4/1960 | Johnston | ............ | 43/44.9 |
| 3,010,244 A * | 11/1961 | Mattingly | ............ | 43/43.15 |
| 3,059,370 A * | 10/1962 | Moore | ............ | 43/41.2 |
| 3,076,284 A * | 2/1963 | Adams | ............ | 43/43.1 |
| 3,082,562 A * | 3/1963 | Duncan | ............ | 43/43.1 |
| 3,087,275 A * | 4/1963 | Svoboda | ............ | 43/44.91 |

(Continued)

FOREIGN PATENT DOCUMENTS

DE          3922613 C1 * 12/1990

(Continued)

*Primary Examiner*—Darren W Ark
(74) *Attorney, Agent, or Firm*—Jonathan Rigdon Smith (57) ABSTRACT

A popping float fishing rig has a float and beads mounted slidably on a rigid wire, in combination with a substantial weight. The weight may either be fixed at the lower end of the wire, or slidably mounted on the wire below the float. Such an arrangement provides truer casting, less tangling, and better fish attractant properties as compared to the prior art.

5 Claims, 7 Drawing Sheets

U.S. PATENT DOCUMENTS

| | | | | |
|---|---|---|---|---|
| 3,106,797 | A * | 10/1963 | Hancock | 43/44.87 |
| 3,178,847 | A * | 4/1965 | Mousseau | 43/43.12 |
| 3,201,892 | A * | 8/1965 | Graham | 43/44.91 |
| 3,220,139 | A * | 11/1965 | Bessler | 43/42.31 |
| 3,255,549 | A * | 6/1966 | Riley | 43/44.88 |
| 3,292,296 | A * | 12/1966 | Viveiros | 43/43.15 |
| 3,364,614 | A * | 1/1968 | Huebotter | 43/43.15 |
| 3,372,508 | A * | 3/1968 | Maglinger | 43/43.15 |
| 3,461,596 | A * | 8/1969 | Green | 43/43.15 |
| 3,468,053 | A * | 9/1969 | Lux | 43/42.31 |
| 3,608,229 | A * | 9/1971 | Ross | 43/43.15 |
| 3,698,120 | A * | 10/1972 | Grogan | 43/44.87 |
| 3,703,783 | A * | 11/1972 | Pool | 43/43.11 |
| 3,832,795 | A * | 9/1974 | Wolfe | 43/43.1 |
| 3,841,013 | A * | 10/1974 | Sabagonis | 43/43.15 |
| 3,875,695 | A * | 4/1975 | Futch, Jr. | 43/44.91 |
| 3,897,649 | A * | 8/1975 | Jorgensen | 43/43.15 |
| 3,898,755 | A * | 8/1975 | Halvorson | 43/1 |
| 3,982,349 | A * | 9/1976 | Hills | 43/42.39 |
| 3,987,576 | A * | 10/1976 | Strader | 43/42.31 |
| 4,060,925 | A * | 12/1977 | Bias | 43/41.2 |
| 4,069,609 | A * | 1/1978 | Demy | 43/42.39 |
| 4,139,960 | A * | 2/1979 | Chojnowski | 43/43.1 |
| 4,268,988 | A * | 5/1981 | Johnson, Jr. II | 43/43.1 |
| 4,727,676 | A * | 3/1988 | Runyan | 43/43.1 |
| 4,817,326 | A * | 4/1989 | Benjestorf | 43/44.9 |
| 5,274,945 | A * | 1/1994 | Ross | 43/44.91 |
| 5,279,066 | A * | 1/1994 | Camera | 43/43.1 |
| 5,331,760 | A * | 7/1994 | DuMont | 43/44.91 |
| 5,359,804 | A * | 11/1994 | Burns | 43/44.91 |
| 5,398,440 | A * | 3/1995 | Amundsen | 43/44.9 |
| 5,404,668 | A * | 4/1995 | Christensen | 43/44.87 |
| 5,456,041 | A * | 10/1995 | Schoeberlein | 43/44.91 |
| 5,555,668 | A * | 9/1996 | Brasseur | 43/43.15 |
| 5,608,985 | A * | 3/1997 | Kainec | 43/43.15 |
| 5,634,290 | A * | 6/1997 | Johnson | 289/17 |
| 5,647,163 | A * | 7/1997 | Gorney | 43/42.13 |
| 5,775,025 | A * | 7/1998 | Ooten | 43/44.9 |
| 5,784,829 | A * | 7/1998 | Latta | 43/44.91 |
| 5,852,894 | A * | 12/1998 | Shannon et al. | 43/44.9 |
| 5,887,381 | A * | 3/1999 | Stephenson | 43/43.15 |
| 5,953,852 | A * | 9/1999 | Nichols | 43/44.87 |
| 5,960,579 | A * | 10/1999 | Hampton | 43/44.9 |
| 6,158,164 | A * | 12/2000 | Mack et al. | 43/44.95 |
| 6,173,524 | B1 * | 1/2001 | Kinchen, Sr. | 43/42.31 |
| 6,233,864 | B1 * | 5/2001 | Mathews et al. | 43/42.31 |
| 6,247,263 | B1 * | 6/2001 | Tiede et al. | 43/44.87 |
| 6,301,822 | B1 * | 10/2001 | Zernov | 43/42.31 |
| 6,389,736 | B1 * | 5/2002 | Frost | 43/44.87 |
| 6,389,737 | B1 * | 5/2002 | Larumbe Salinas | 43/44.87 |
| 6,453,599 | B2 * | 9/2002 | Mathews et al. | 43/42.31 |
| 6,484,435 | B1 * | 11/2002 | Mosher | 43/44.87 |
| 6,609,326 | B2 * | 8/2003 | Salonen et al. | 43/42.22 |
| 6,618,980 | B1 * | 9/2003 | De Boer, Jr. | 43/43.15 |
| 6,745,511 | B1 * | 6/2004 | Falconer | 43/43.15 |
| 6,874,272 | B1 * | 4/2005 | Adams et al. | 43/42.31 |
| 6,880,288 | B1 * | 4/2005 | Hanes | 43/44.87 |
| 6,955,005 | B2 * | 10/2005 | Storelli | 43/43.15 |
| 7,117,629 | B2 * | 10/2006 | Brzozowski | 43/43.15 |
| 2001/0047609 | A1 * | 12/2001 | Orgeron et al. | 43/42.31 |
| 2005/0091909 | A1 * | 5/2005 | Hanes (Ooten) | 43/44.87 |
| 2005/0097806 | A1 * | 5/2005 | Schumacher et al. | 43/44.9 |
| 2005/0257419 | A1 * | 11/2005 | Weeda | 43/44.87 |
| 2006/0288633 | A1 * | 12/2006 | Fiferlick | 43/44.87 |
| 2008/0040966 | A1 * | 2/2008 | Stone et al. | 43/43.15 |

FOREIGN PATENT DOCUMENTS

| | | | |
|---|---|---|---|
| DE | 4301517 | A1 * | 8/1993 |
| DE | 19836255 | A1 * | 2/2000 |
| EP | 348582 | A1 * | 1/1990 |
| GB | 2203622 | A * | 10/1988 |
| GB | 2208781 | A * | 4/1989 |
| GB | 2238939 | A * | 6/1991 |
| JP | 08019358 | A * | 1/1996 |
| JP | 09028257 | A * | 2/1997 |
| JP | 10286050 | A * | 10/1998 |
| JP | 11220988 | A * | 8/1999 |
| JP | 11289938 | A * | 10/1999 |
| JP | 11299405 | A * | 11/1999 |
| JP | 2001061387 | A * | 3/2001 |
| JP | 2003169575 | A * | 6/2003 |
| JP | 2005034070 | A * | 2/2005 |
| JP | 2006025716 | A * | 2/2006 |
| JP | 2006180722 | A * | 7/2006 |
| WO | WO 9634524 | A1 * | 11/1996 |

* cited by examiner

FLOAT FISHING APPARATUS

The invention specified and claimed in this application constitutes a significant change and improvement in the art of float fishing. The typical prior art float fishing apparatus comprises a buoyant float fixedly attached to the end of a fishing line, below which is suspended one or more weighted hooks or lures. The weight is commonly called a "sinker." The buoyancy of the float is greater than the combined weight of the sinker, hook(s), and lure or bait, to assure that the float will stay on the water surface and be visible to the angler. A pre-selected length of additional fishing line is used to set the depth of the weight and hook(s) below the float. When a fish strikes the lure or bait, the float moves and alerts the angler.

Figure 1:
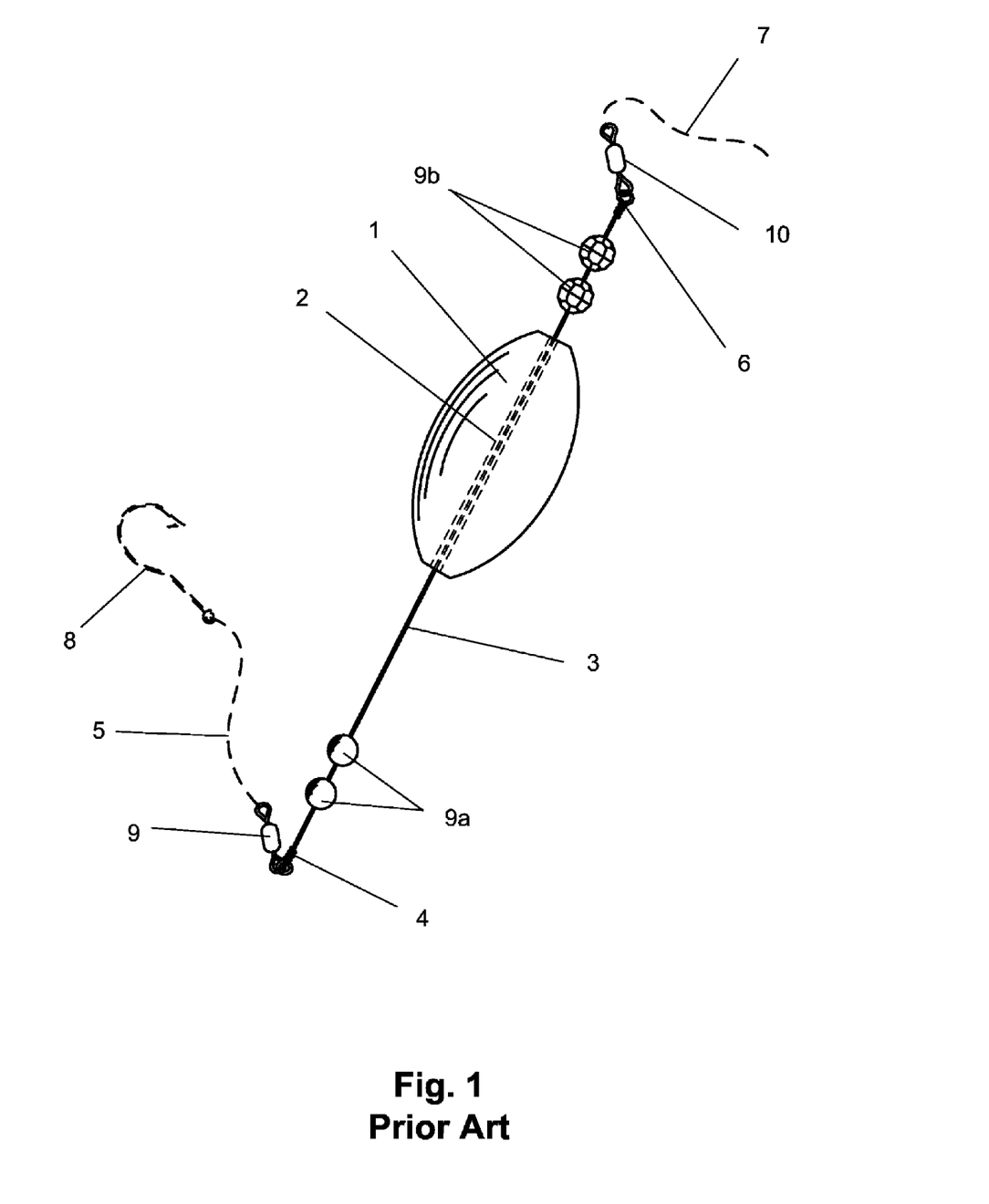
FIG. 1 is a side view of a prior art popping float apparatus described above.

A relatively recent prior art innovation in the art of float fishing is the "popping" rig, shown in FIG. 1. (In this and all figures attached to this application, environmental structure is drawn in dashed lines.) The popping rig comprises a float 1 having a central bore 2 through which a rigid wire 3 extends. (The central bore 2 of the float 1, as well as part of wire 3 within it, are hidden and shown in dotted lines.) The diameter of bore 2 is greater than that of wire 3 so that wire 3 may slide freely up and down through the float 1.

A first end 4 of wire 3 is connected to a first swivel 9, which in turn is connected by fishing line or leader 5 to one or more lures or fishhooks 8. (The leader 5 and fishhook 8 are environmental structure to what is called the "rig" in this application.) The swivel is a means commonly-used by anglers to connect rigs, line, sinkers, leaders, lures and hooks to one another. It has loops at either end that can rotate independently of each other, thereby allowing the hook (and hopefully, a fish) to rotate relative to the wire. This reduces somewhat the potential for tangling because the fishing line has a lesser tendency to wind up at the connection point. A simple wire loop, piece of twisted wire, or a piece of fishing line may also be used as a connecting means, although it does not have the torque-relieving ability of a swivel.

Fishing line or leader 5 may also have a weight (not shown) fixedly attached to it, called a "sinker", to assure that the hook 8 descends fully to the desired depth below the float.

The second end 6 of wire 3 is connected to a second swivel 10, to which is tied a second fishing line 7 (environmental structure) leading to a fishing rod and reel (not shown) in control of the angler. One or more beads 9a and 9b with central holes may be placed on wire 3 either above or below the float so that they too can slide up and down on the wire. The beads are typically shiny spheres (9a) or colorful polyhedrons (9b) known to attract fish.

The purpose of the sliding wire is to allow the angler periodically to jerk it briefly, or "pop" it, upwardly through the float. The float, being held against sudden movement by fluid friction and surface tension of the water, tends to stay put as the wire is jerked upward. The beads are raised upward by frictional contact with the wire, and then they immediately drop back down into contact with each other and other parts of the rig. When the beads make this contact, they create a clicking noise simulative of the movements of prey such as shrimp. The movement of the beads, visible to fish, along with the clicking sound, attract fish to the bait or lure.

A significant problem with such popping rigs, however, is that they usually tumble through the air when cast, which promotes entanglement between with the fishing line above the float with the leader, hook, and bait below the float. If the angler notices the entanglement, he or she must reel in the rig, disentangle it, and recast the rig. The entanglement may cause the bait to be lost or cause damage to the wire and/or float. Additionally, the angler may not immediately notice the entanglement or loss of bait, and waste time unaware that the functionality of the rig is lost.

The tumbling effect also increases aerodynamic drag, which not only reduces the cast distance but also adversely affects the accuracy of the cast and resulting placement of the rig in the water, especially under windy weather conditions. An improvement has been needed in popping float rigs to solve these problems. The invention is not a mere cork or float rig, but rather a casting device. The present invention marks the first time a prior art popping cork has been transformed into a casting device.

Thus, it is a principal object of this invention to eliminate tumbling of the rig during casting, thereby reducing the incidence of tangling and improving the casting distance and accuracy. Another object of the invention is to create a "paddle effect" which, as will be more fully explained below, adds some directional control and fish attracting movement to the rig.

DETAILED DESCRIPTION OF THE DRAWINGS

FIG. 1 is a side view of a prior art popping float apparatus as described in detail above.

Figure 2:
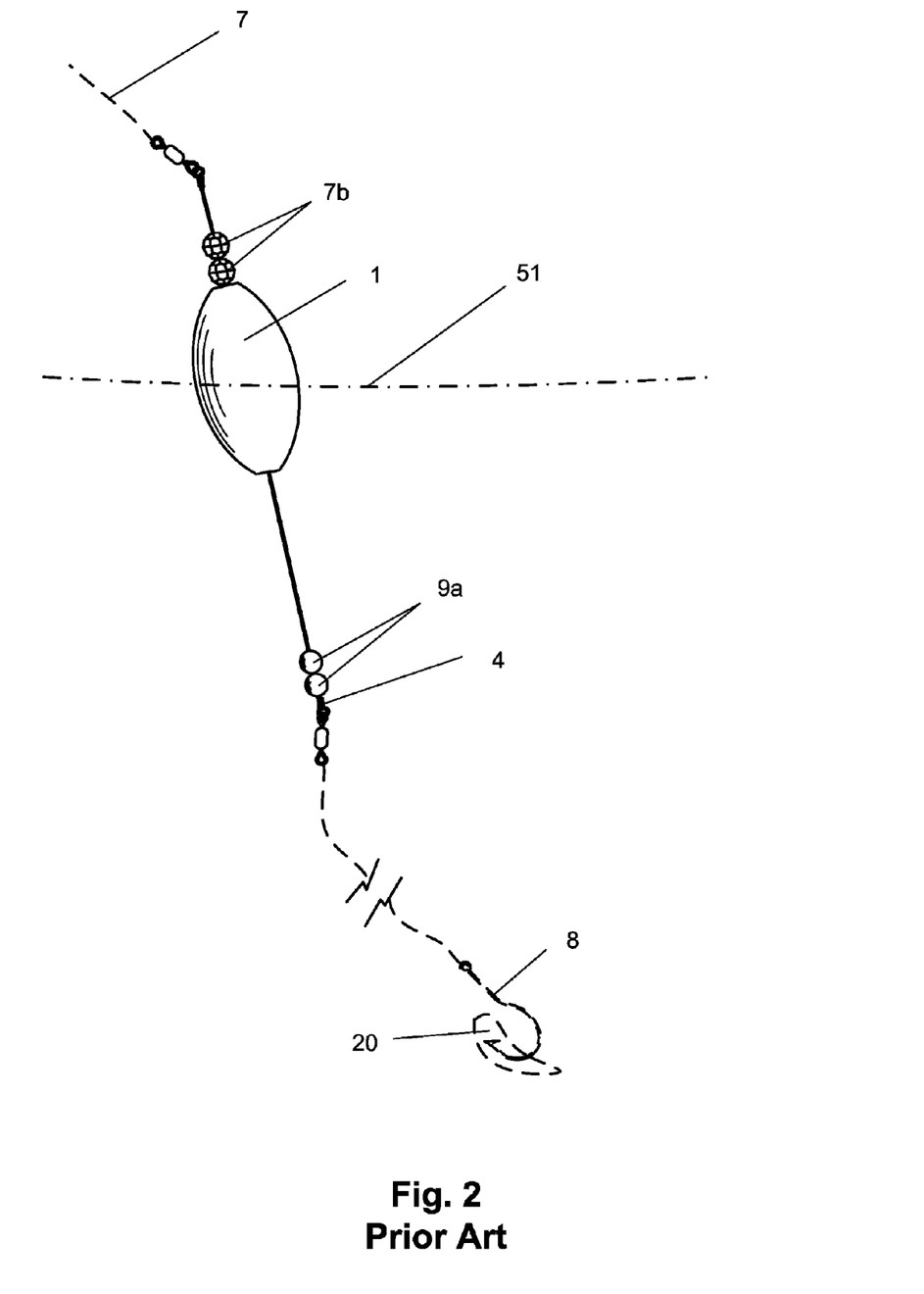
FIG. 2 is the prior art popping float apparatus of FIG. 1 as it would normally be oriented in the water.

FIG. 2 is the prior art popping float apparatus of FIG. 1 as it would normally be oriented in the water after being cast. Note float 1 buoyed on water surface 51. Provided the rig does not tangle during casting, it will end up in the water more or less as shown with the fishing line 7 uppermost and the hook 8 and bait 20 submerged to their farthest extent. (7, 8, 20 are environmental structure.) Immediately after the cast and as soon as the rig begins to orient itself as shown, beads 9a and 9b will slide downwardly along wire 3 until they are stopped by first end 4 and float 1 respectively, making a clicking noise as they strike each other. Such clicking noises are similar to noises made by the skeletal parts of live prey as they move, and is attractive to fish.

Figure 3:
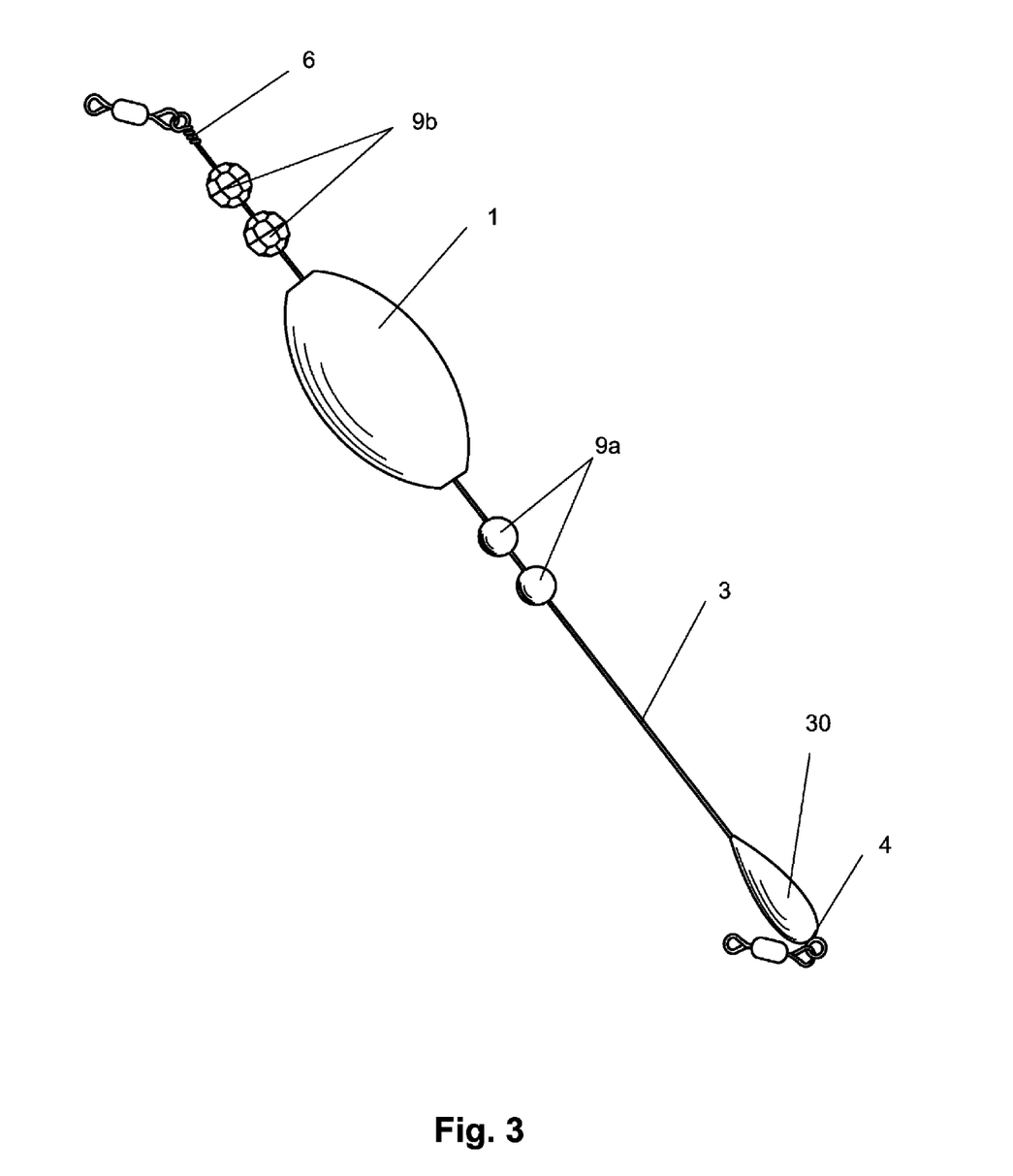
FIG. 3 is a side view of the preferred embodiment of the present invention.

FIG. 3 is a side view of the preferred embodiment of the present invention. It is distinguished from the prior art in that a substantial weight 30 is fastened about first end 4 of wire 3. The mass of the weight 30 is preferably selected to be just great enough to place the center of gravity of the rig closer in distance along wire 3 to the first end 4 than to the second end. In other words, the balance point of the rig along the wire, when the float 1 and beads 9a and 9b are slid as far to the upper left in this view as possible, will be to the lower right of center. For a typical float 1 capable of buoying the entire mass of the rig, a desirable weight 3 has been found to be approximately ½ ounce, or 14 grams. A convenient and inexpensive way of fixing the weight 30 in position is by fusing the weight to the wire, although any secure means of adhesion would be suitable.

The fixed position of weight 30 as just described has two principal beneficial effects on the flight of the rig during the cast. First, by being heavier than first end 4 would otherwise be, even with beads 9a near that end, that end will tend more reliably to be swung out farthest away from the rod at the beginning of the cast. The second benefit is to reduce tumbling of the rig in flight because of the change in weight distribution from the prior art, described as follows.

After it is cast, the prior art rig of FIG. 1, not having weight 30, will tumble nearly completely free of restraint save for the small amount of restraint the fishing line has on rotation of the rig in the air as the line pays out from the reel on the angler's rod. Moreover, as the rig tumbles, it is just as likely that the sliding parts on the rig will move toward second end 6 as toward first end 4 under the influence of centrifugal force. If this happens, there is more opportunity for the fishing line 7 to become wound about first end 4 and hook 8 in flight, and second end 6 and float 1 will hit the water first, followed by fishing line, hook, and bait falling on top of it. If, by chance, no tangling does occur among all the articulating parts being cast (i.e., the rig, the sinker (if any), the hook or lure, and the fishing line) during flight, this tumbling will be of no consequence because the parts of the rig should assume the orientation of FIG. 2 after the rig hits the water. However, whether tangling occurs in flight is a matter of chance because under the prior art the tumbling is essentially uncontrollable.

Figure 4:
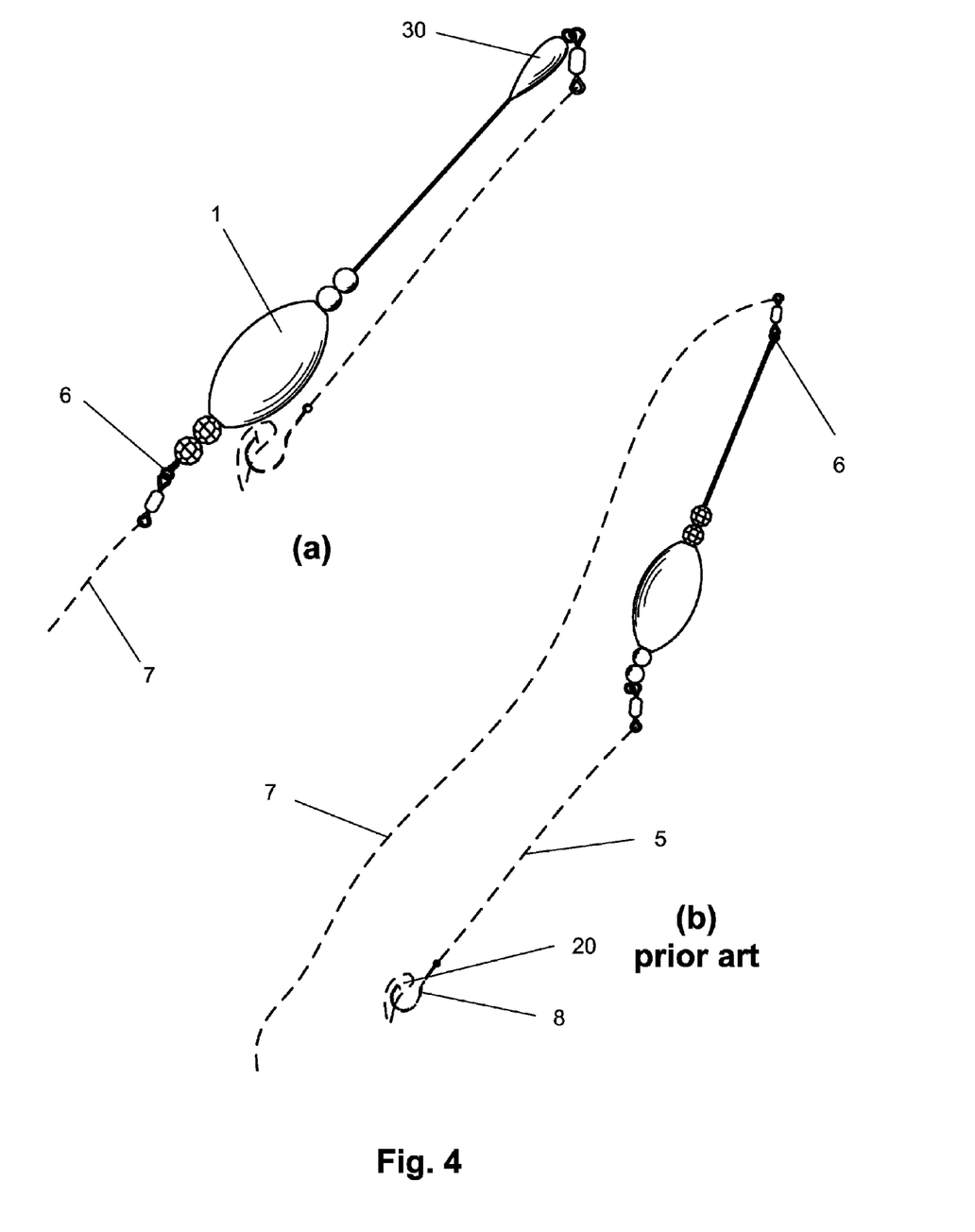
FIG. 4 is a side view of the preferred embodiment of the present invention in flight during a cast.

With the present invention, by contrast, the weight distribution significantly increases the inertia of first end 4 of the rig, so that any retarding force on the rig, such as wind resistance and the tug of the fishing line paying out, will tend to straighten the flight of the rig behind the weight, as shown in FIG. 4. This inertia also increases the moment of inertia of the rig about the center of gravity. A given rate of tumbling therefore requires more rotational energy in the present invention than in the prior art rig. Thus, if in a given cast, a certain amount of rotational energy is imparted to the rig, the rotation rate will be lower with the present invention than with the prior art rig. Users of the present invention report that its behavior when cast is much like that of a thrown dart, in terms of both feel and accuracy.

FIG. 4a is a side view of the preferred embodiment of the present invention in flight during a cast under these influences. Because the float 1 has the largest cross-section of all of the rig parts, wind resistance will tend to push the float 1 and one pair or the other of beads towards either one end of the other of the rig. However, because fixed weight 30 will give the present invention the tendency to lead initially in flight, float 1 and the other parts will tend to move under wind resistance toward the trailing second end 6. The float slides to the unweighted end of the shaft by centrifugal force and due to aerodynamic pressure during flight. The float thus acts as a fletching device as found on an arrow or a dart. Hook 8 and bait 20 will also trail weight 30, but, as compared to a likely flight condition of the prior art rig shown in FIG. 4b, even assuming tumbling is not taking place, second end 6 can easily be the leading end, and hook 8 and bait 20 trail even further. Thus, more opportunity exists for tangling of various parts, especially between hook 8 and fishing line 7. The existence of a sinker (not shown) on line or leader 5 above hook 8 would serve merely as another point of articulation for additional entanglement risks.

The increased inertia of the present invention will also make it more resistant to crosswind effects on windy days, which can include additional tumbling influence as well as diversion of the rig from its intended direction. In addition, because the angler can apply more kinetic energy to the rig in casting (because of the added weight), more energy is available to overcome aerodynamic drag and greater casting distances are possible. This effect also contributes to the dart-like characteristics of the rig.

Figure 5:
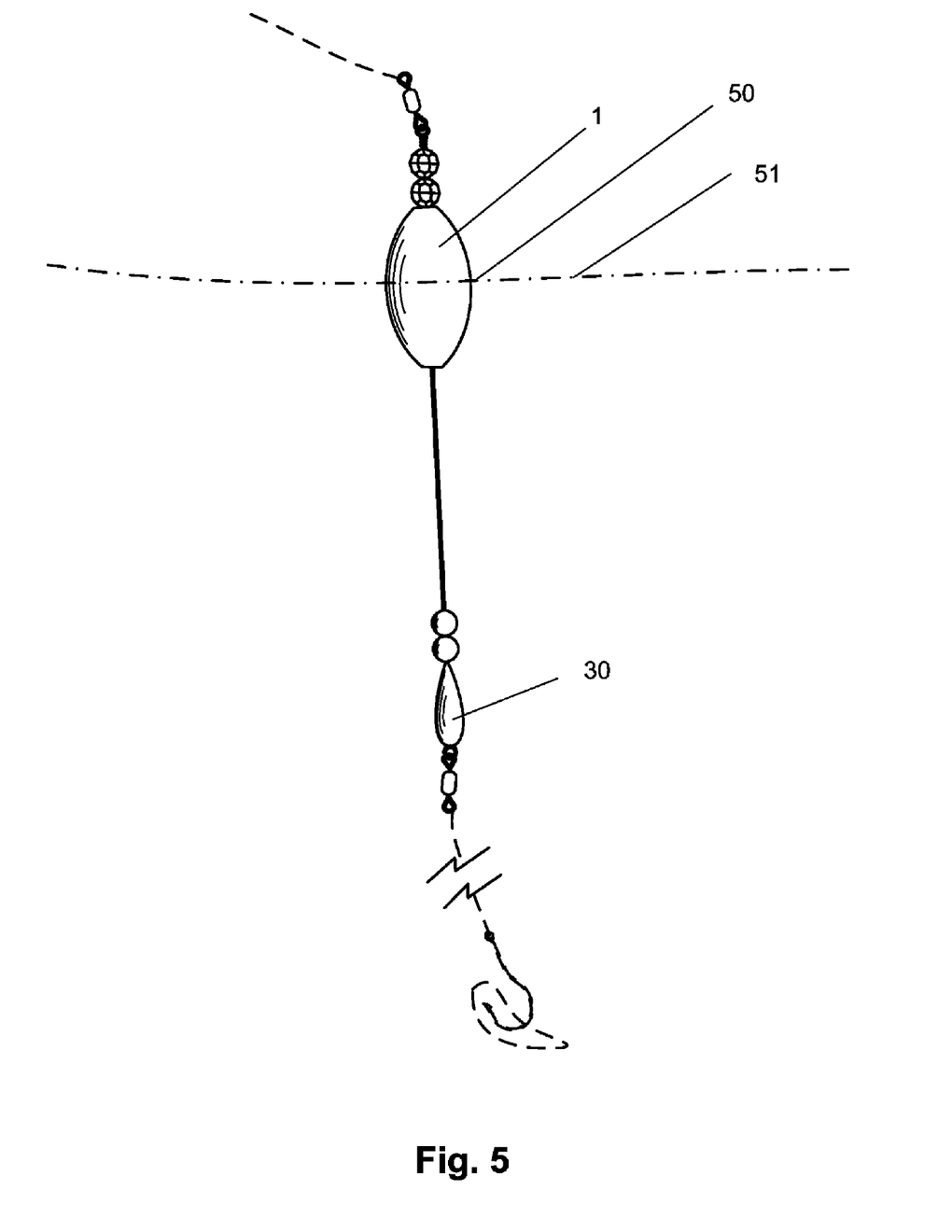
FIG. 5 is a side view of the preferred embodiment as it would normally be oriented in the water.

FIG. 5 is a side view of the preferred embodiment as it would normally be oriented in the water. The choice of the size and density of the float 1 and the masses of the items below, especially weight 30, will dictate the vertical position of the float's waterline 50 on the surface 51 of the water. While this and other figures show the float 1 in the shape of a prolate spheroid, virtually any of the common float shapes (e.g., spherical and cigar-shaped) may be used equally well in the present invention. Likewise, the shape of the weight 30, shown here in a teardrop shape, may be virtually any shape. For aerodynamic reasons, it is advisable to make such shapes axially symmetrical, though this is not an absolute requirement and is not meant to restrict the scope of this invention. Alternative shapes, sizes, and densities of the float, beads, and weight are meant to be included in the scope of the invention without limitation, as well as the number of beads on the wire unless specifically claimed otherwise.

Figure 6:
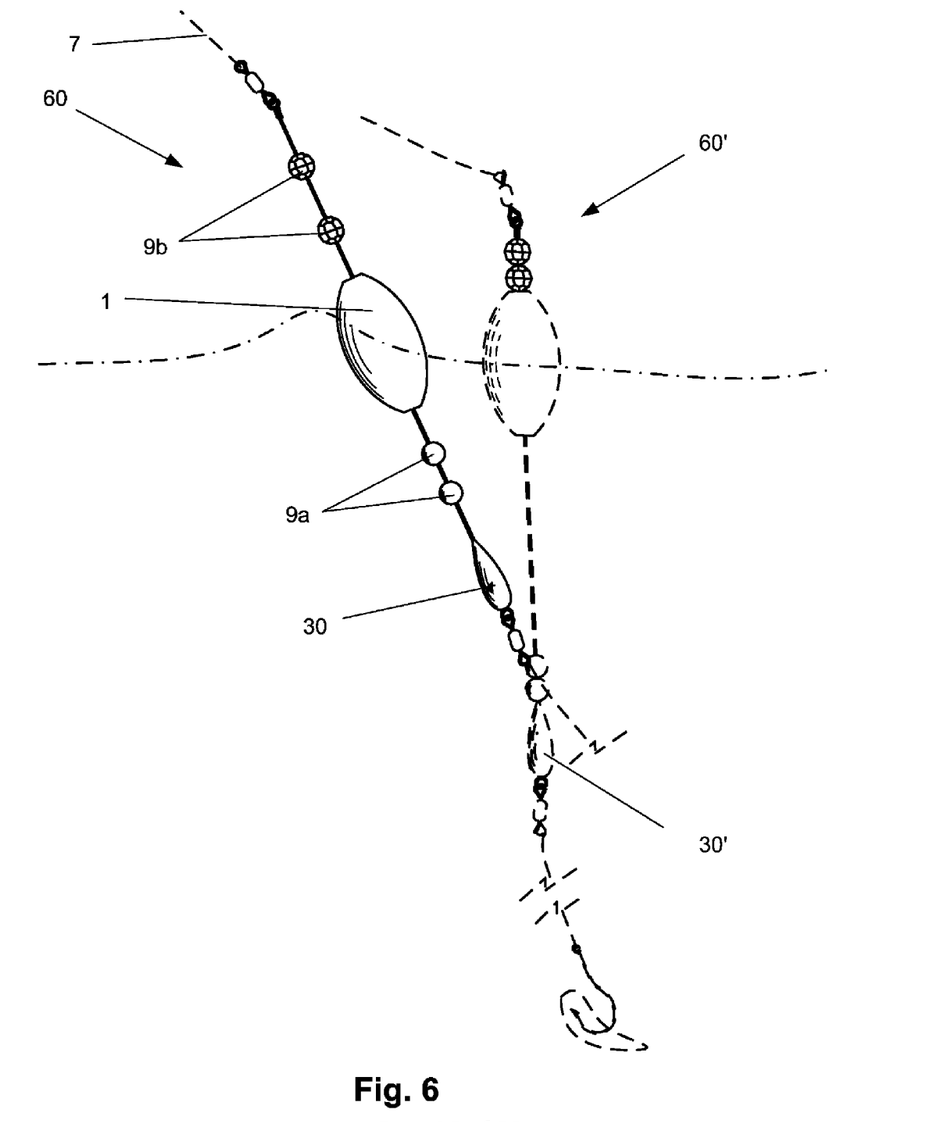
FIG. 6 is a side view of the preferred embodiment exhibiting a "paddle effect" as it is popped.

FIG. 6 is a side view of the preferred embodiment exhibiting, as it is popped, the "paddle effect" mentioned earlier. The dashed FIG. 60' on the right side of FIG. 6 is a duplicate of FIG. 5. When the angler jerks the line to "pop" the rig, the rig will tilt to a leftward position 60. Because the weight 30 is the most massive part of the rig, its inertia will tend to keep it close to its original position 30'. As a result, float 1 will have to "paddle" to its left. Note that the typical popping effects of raising the beads 9a and 9b along the wire (so that they will click when they fall back down) also occur.

When the angler releases the tension on the line after popping the rig, the rig will tend to reassume its vertical orientation as in 60' by rotating (relatively slowly) about the center of hydrodynamic drag, located more or less at the center of the float 1. The entire rig will then be in a vertical orientation to the left of its original position 60'. In this manner, the rig can be "paddled" short distances in the direction of pull without actually dragging the rig through, or raising it out of, the water. This movement in the water creates a small surface swirl that is attractive to fish. Contrast this with the effect of popping a prior art rig. When the prior art rig is popped, the absence of a weight fixed to the bottom end of the wire will cause the rig merely to rotate about the center of the float, so that when the rig returns to its vertical orientation, the float will not have moved significantly along the surface of the water. No paddle-like disturbance of the water surface occurs. Said another way, the difference between the prior art and the present invention in this regard is that when popped, both the initial and final rotation of the prior art rig is in a vertical plane centered more-or-less on the float, leaving it in the same location on the water, whereas in the present invention, the initial rotation is a vertical plane centered substantially on the weight, and the final rotation is in a vertical plane centered on the float, causing a shift in position.

Figure 7:
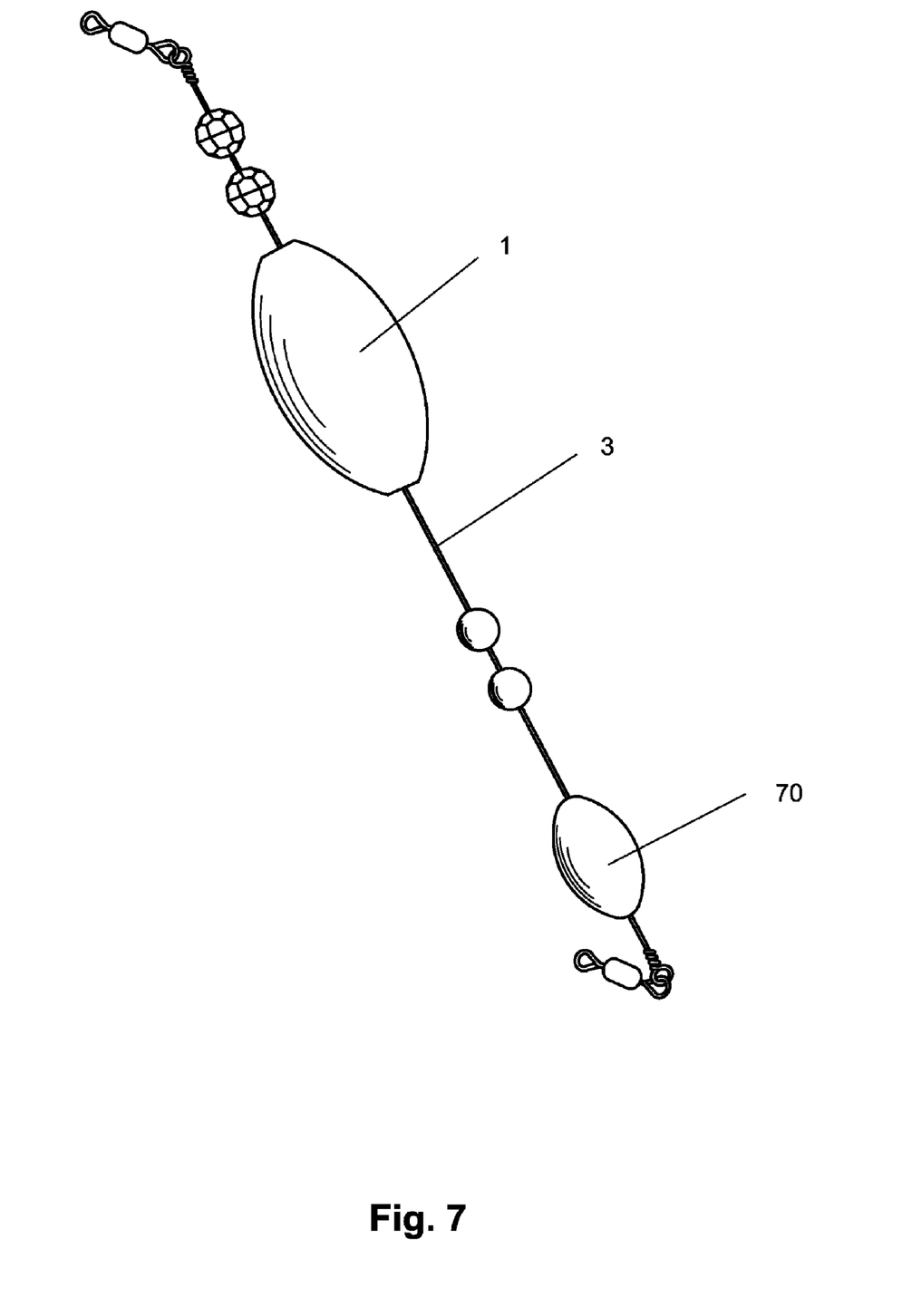
FIG. 7 is a side view of the second embodiment of the present invention.

FIG. 7 is a side view of the second embodiment of the present invention. In this embodiment, a weight 70, similar in mass to weight 30 of FIG. 3, is slidably mounted on wire 3. This embodiment increases the weight below the float 1 and increases the intensity of the underwater clicking noise produced when it is popped.

What is claimed is:

1. A float fishing apparatus, comprising:
   a rigid thin rod having a first length and a first end and a second end, the first end having a first connecting means fixed thereto, and the second end having a second connecting means fixed thereto;

a float having a centerline of a second length, and having a hole formed along the entire centerline from one end of the float to the other, the hole being of slightly larger diameter than a thickness of the rod, the rod passing slidably through the hole;

the first length being greater than the second length, such that when the float is positioned near a midpoint of the rod, a first portion of the rod, having the first connecting means at the first end, extends downwardly from the float; and a second portion of the rod, having the second connecting means at the second end, extends upwardly from the float;

a weight having a density greater than water, the weight being fastened to the rod adjacent to the first connecting means; and at least one bead having a bore formed through the at least one bead of slightly larger diameter than the thickness of said rod, said rod passing slidably through the bore, said at least one bead further comprising a plurality of beads mounted on said rod, two of said plurality of beads are mounted on said first portion, and another two of said plurality of beads are mounted on said second portion.

2. The apparatus of claim 1, wherein:
said weight has a mass of between one gram and twenty-eight grams.

3. The apparatus of claim 2, wherein:
said weight has a mass of between seven grams and twenty-one grams.

4. The apparatus of claim 1, wherein:
said beads mounted on said first portion are spherical, and said beads mounted on said second portion are polyhedral.

5. A method for casting the apparatus of claim 1 by a person manipulating a fishing rod and reel, the rod being equipped with the reel and having a distal end away from the person manipulating the rod, comprising the steps of:

a) suspending the apparatus on a fishing line from the distal end of the fishing rod;

b) rotating the rod so as to move the distal end in a circular path about the person;

c) causing said weight to move by centrifugal acceleration to a farthest extent of the fishing line;

d) allowing said weight to unwind the fishing line from the reel; and e) allowing aerodynamic drag to cause said float, said beads, a hook, and bait to trail behind said weight until said apparatus hits the water.

* * * * *